L. LETZEISEN.
SPECTACLES.
APPLICATION FILED MAR. 16, 1917.
1,252,126.
Patented Jan. 1, 1918.
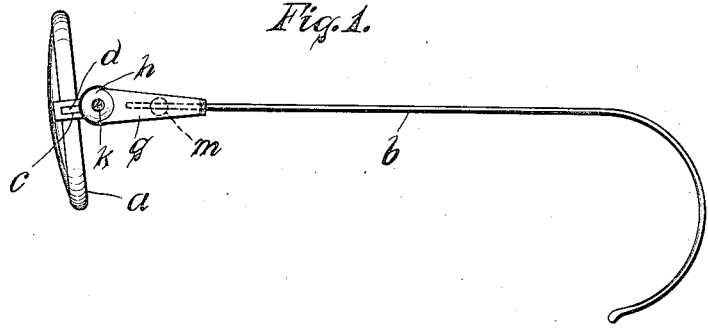
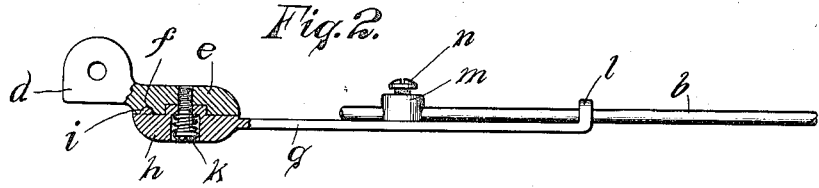
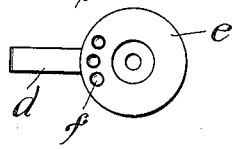
INVENTOR.
Louis Letzeisen:
BY
ATTORNEY.

UNITED STATES PATENT OFFICE.

LOUIS LETZEISEN, OF HARTFORD, CONNECTICUT.

SPECTACLES.

1,252,126.  Specification of Letters Patent.  Patented Jan. 1, 1918.

Application filed March 16, 1917. Serial No. 155,190.

*To all whom it may concern:*

Be it known that I, LOUIS LETZEISEN, a citizen of the United States, and a resident of Hartford, county of Hartford, State of Connecticut, have invented certain new and useful Improvements in Spectacles, of which the following is a specification.

The object of this invention is first to provide a means for adjusting the angular position of the lens frame relative to the temples in order to permit of bringing the lenses into proper position for use without inconvenience to the wearer; a second object of the invention is to provide means for adjusting the length of the temples.

In the drawings—

Figure 1 is a side view of an embodiment of my invention.

Fig. 2 is a top view, on enlarged scale, with parts broken away to show construction.

Fig. 3 is a detail view.

Referring to the drawings, $a$ denotes the lens frame and $b$ the temple. The means for providing adjustment of the lens frame comprise a pair of adjusting members, one of which, $c$, is connected to the lens frame by a hinge joint $d$ in order to permit the temples to be folded down in the usual way, this member being provided with a small disk $e$ which as shown has a circumferentially arranged series of slight depressions $f$. The other member of this pivotal connection is a strap $g$ having at one end a disk $h$ corresponding in size to the disk of the first mentioned member and equipped with a slight projection $i$ adapted to engage in the depressions in the other disk. The two disks are centrally pierced and connected together by a screw or rivet $k$. The projection $i$ is very slightly above the face of the disk $h$, and there is sufficient spring in the metal and the connection to permit of the two members being rotated relatively to one another.

It will be obvious that the position of the lens frame with respect to the eye of the wearer can by this means be varied so that proper vision is secured without moving the head to unnatural or uncomfortable positions.

The end of the strap opposite to the disk is bent up at right angles to form a lug $l$ which is pierced to receive the inner end of the temple, which then passes through a small stud $m$ fast on the strap, and is engaged by the set screw $n$. This provides means for varying the distance between the lens frame and the loops at the ends of the temples.

I claim as my invention:

In a device of the character described, the combination with a lens frame and temples, of members having a hinge connection with the ends of said lens frame, each of said members being provided with a centrally pierced disk, strap members provided with centrally pierced disks for coöperation with the first mentioned disks, means for securing said disks together face to face, means on the contacting faces of said disks to hold them in position of adjustment, and means on said straps for securing said temples thereto.

LOUIS LETZEISEN.